United States Patent [19]

Nagano

[11] Patent Number: 4,619,632
[45] Date of Patent: Oct. 28, 1986

[54] REAR DERAILLEUR FOR A BICYCLE
[75] Inventor: Masashi Nagano, Izumi, Japan
[73] Assignee: Shimano Industrial Company Limited, Osaka, Japan
[21] Appl. No.: 762,404
[22] Filed: Aug. 5, 1985
[30] Foreign Application Priority Data Aug. 8, 1984 [JP] Japan .................. 59-122365[U]

[51] Int. Cl.$^4$ ............................................. F16H 9/00
[52] U.S. Cl. ........................................ 474/80; 474/82
[58] Field of Search ....................... 474/80, 82, 144

[56] References Cited
U.S. PATENT DOCUMENTS 4,194,409  3/1980  Nagano .................. 474/80

Primary Examiner—James A. Leppink
Assistant Examiner—Frank McKenzie
Attorney, Agent, or Firm—Stevens, Davis, Miller & Mosher

[57] ABSTRACT

A rear bicycle derailleur is provided which includes (1) a chain guide formed of a guide pulley, a tension pulley and first and second plates supporting the guide and tension pulleys, and (2) a derailleur body having a movable member supporting the chain guide and support means supporting the movable member to be movable axially of the multistage sprocket assembly. The first plate includes a first restrainer at a side of the first plate adjacent the derailleur body, with the first restrainer being positioned radially outwardly relative to the guide pulley at a location outside a first predetermined chain movement path along which the chain travels from a high speed sprocket of the multistage sprocket assembly to the tension pulley through the guide pulley when the multistage sprocket assembly rotates in reverse. The first restrainer prevents the chain from moving away from the first chain movement path when the multistage sprocket assembly rotates in reverse. The second plate includes a second restrainer positioned radially outwardly relative to the guide pulley at a location outside a second predetermined chain movement path along which the chain travels from a low speed sprocket of the multistage sprocket assembly to the tension pulley through the guide pulley when the multistage sprocket assembly rotates in reverse. The second restrainer prevents the chain from moving away from the second chain movement path when the multistage sprocket assembly rotates in reverse.

3 Claims, 3 Drawing Figures

REAR DERAILLEUR FOR A BICYCLE

FIELD OF THE INVENTION

This invention relates to a rear derailleur for a bicycle, and more particularly to a rear derailleur provided with a chain guide comprising a guide pulley, a tension pulley and plates for supporting these pulleys so that a driving chain can be switched to a selected sprocket of a multistage sprocket assembly at the bicycle.

DESCRIPTION OF THE PRIOR ART

Generally, the above type of derailleur includes a derailleur body including a linkage mechanism primarily comprising a base member, a pair of linkage members and a movable member, with the movable member pivotally supporting the chain guide. The rear derailleur is disposed axially outwardly of a high speed sprocket at the multistage sprocket assembly and is mounted through the base member onto the bicycle frame supporting a rear wheel. In operation the driving chain, which is stretched across a front derailleur and one sprocket of the sprocket assembly is carried with the tension pulley and guide pulley and switched to a selected one of the multistage sprocket assembly. A control wire is pulled to move the movable member toward a low speed sprocket, having a largest number of teeth against the bias applied by a return spring provided at the derailleur body. The return spring restores the movable member toward a high speed sprocket having a smallest number of teeth.

When the bicycle is running forwardly by normal pedalling, the chain is smoothly switched, but when a cyclist pedals in the reverse direction, especially when the chain engages with the high speed sprocket and the control wire is pulled with the intent to move the chain guide from the high speed sprocket to the low speed one, a problem is created in that when the reverse pedalling rotates the multistage sprocket assembly in the reverse direction, the edge of a connecting pin and the edge of an outer plate at the chain are caught by the low speed sprocket adjacent to the sprocket presently in engagement with the chain and the chain moves following the adjacent low speed sprocket. As a result, tension of the chain increases so as to release the chain from the adjacent sprocket. Also as a result, the chain causes a wave motion with respect to the guide pulley, so that the chain disengages from the guide pulley and rides over the derailleur body beyond the plate. In this condition in which the chain disengages from the guide pulley, when the multistage sprocket assembly is normally driven, the chain is caught in part by the derailleur body and is locked thereby. Hence, the derailleur body is subjected to an excessive force caused by normal rotation of the sprocket, thereby creating a problem of a breakdown of the derailleur.

When the control wire is pulled in a range of not-switching the chain, deflection of the chain itself, a gap between the pulley plate and the chain, or deflection of the chain guide, causes the portion of the chain which is in engagement with each pulley to move together with the chain guide toward the low speed sprocket. On the other hand, the portion of the chain which is in engagement with the high speed sprocket is intended to remain thereat, whereby the chain is slanted between the high speed sprocket and the guide pulley. Accordingly, when the multi-stage sprocket assembly is caused to rotate in reverse by reverse pedalling, the portion of the chain in engagement with each pulley is stretched between the high speed sprocket and the front gear and also moves in reverse while slanting between the high speed sprocket and the guide pulley. The chain slanted between the high speed sprocket and the guide pulley is brought into press-contact with the teeth of the low speed side sprocket adjacent to the sprocket in engagement with the chain. On the other hand, the connecting pin for the outer plate and inner plate at the chain projects outwardly from the outer plate, and the outer plate and inner plate are stepped at the lengthwise end edges therebetween. As a result, when the slanted chain moves in reverse, the edge of the pin and the edge of the outer plate at the chain are caught by the teeth of the aforesaid adjacent low speed side sprocket. Hence, the chain moves following the teeth thereof, so that the chain is subjected to increased tension and released from the chain-caught sprocket. Thus, the chain is caught and released repeatedly with and from the sprocket to thereby cause a wave-motion radially of the guide pulley, whereby the chain disengages therefrom and rides over the pulley plate. In this condition, if the cyclist normally pedals the bicycle, the derailleur may suffer a breakdown as described above. Also, in a case where the bicycle is carelessly moved backwardly to cause the multistage sprocket assembly to rotate in reverse in a condition of pulling the control wire when the chain engages with the high speed sprocket, the same problem as the aforesaid reverse pedalling will be created.

In detail, when the bicyle is moved backwardly, the portion of the chain which is in engagement with each pulley is put in the slack side of the chain and the chain moves in reverse from the sprocket toward the guide pulley and is slanted between the high speed sprocket and the guide pulley. Hence, in a situation where the bicycle is moved backwardly under the condition of press-contacting the slanted chain with the lateral side of the teeth at the high speed sprocket and the lateral side of the plate, the slanted portion of the chain is difficult to move in reverse toward the tension pulley, while, the chain travels continuously from the high speed sprocket to the guide pulley. As a result, the slanted portion of the chain is swollen radially outwardly of the guide to move beyond the plate and ride on the derailleur body. When the bicycle is moved forwardly, or normal forward pedalling is started under a condition of disengaging the chain from the pulley, the aforesaid problem will be created.

The aforesaid problem is markedly significant in derailleurs which are provided with an energy conserving mechanism capable of previously speed-changing, i.e., a pre-speed-change by the operating lever when the chain is stationary when the cyclist is refraining from pedalling.

SUMMARY OF THE INVENTION

The present invention has been designed in order to solve the problem in that when the multistage sprocket assembly rotates in reverse in a condition in which the chain engages with the high speed side sprocket and the operating lever is turned to the low speed stage, the chain engaging with the high speed sprocket disengages from the guide pulley and falls down sideward of the plate. This invention is provided at a predetermined position on the plate with a restrainer for preventing the chain moving in reverse while slanting from escaping from the chain line.

This invention constitutes an improvement in the type of rear derailleur which includes a chain guide comprising a guide pulley, a tension pulley and first and second plates for supporting both the pulleys so as to switch a driving chain to a selected sprocket of multistage sprocket assembly at the bicycle in order to change the speed thereof. The derailleur according to the invention includes a first restrainer which is provided at the first plate at the guide pulley side thereof and is positioned radially outwardly of the guide pulley and outwardly of a predetermined chain moving path defined as extending along the guide pulley and tension pulley from the high speed sprocket when the multistage sprocket assembly rotates in reverse. The first restrainer prevents the chain from moving away from the chain line when moving from the high speed sprocket to the tension pulley through the guide pulley. It should be noted that the high speed side sprocket in this invention is the sprocket at the high speed stage in relation to the low speed sprocket which has the largest number of teeth.

In the above construction, even when the cyclist pedals in reverse while turning the operating lever from the high speed stage to the low speed one, or the bicycle is backwardly moved to cause the multistage sprocket assembly to rotate in reverse, i.e., even when the chain moves in reverse while slanted between the high speed sprocket and the guide pulley and is caught by the edge of the plate and released therefrom during the reverse rotation of the multistage sprocket assembly so that the chain is put in a wave-motion or swollen, the chain which, as a result of the above conditions, tends to move radially outwardly of the guide pulley is restrained by the first restrainer which prevents the chain from falling down sideward of the guide plate. Also, when the cyclist pedals the bicycle in the normal or forward direction under the above condition, the derailleur can reliably be prevented from suffering a breakdown.

Also, a second restrainer is preferably provided at the second plate and positioned radially outwardly thereof outside a second predetermined chain moving path from the low speed sprocket to the tension pulley through the guide pulley. Hence, the predetermined chain is reliably prevented from escaping the chain line when the multistage sprocket rotates in reverse.

The above and further objects of the invention will become more apparent from the following detailed description when considered in conjunction with the accompanying drawings.

BRIEF DESCRIPTION OF THE DRAWINGS

FIG. 3 is an illustration of the relationship between a driving chain and a chain guide when the multistage sprocket assembly rotates in reverse.

DETAILED DESCRIPTION OF THE INVENTION

Figure 1:
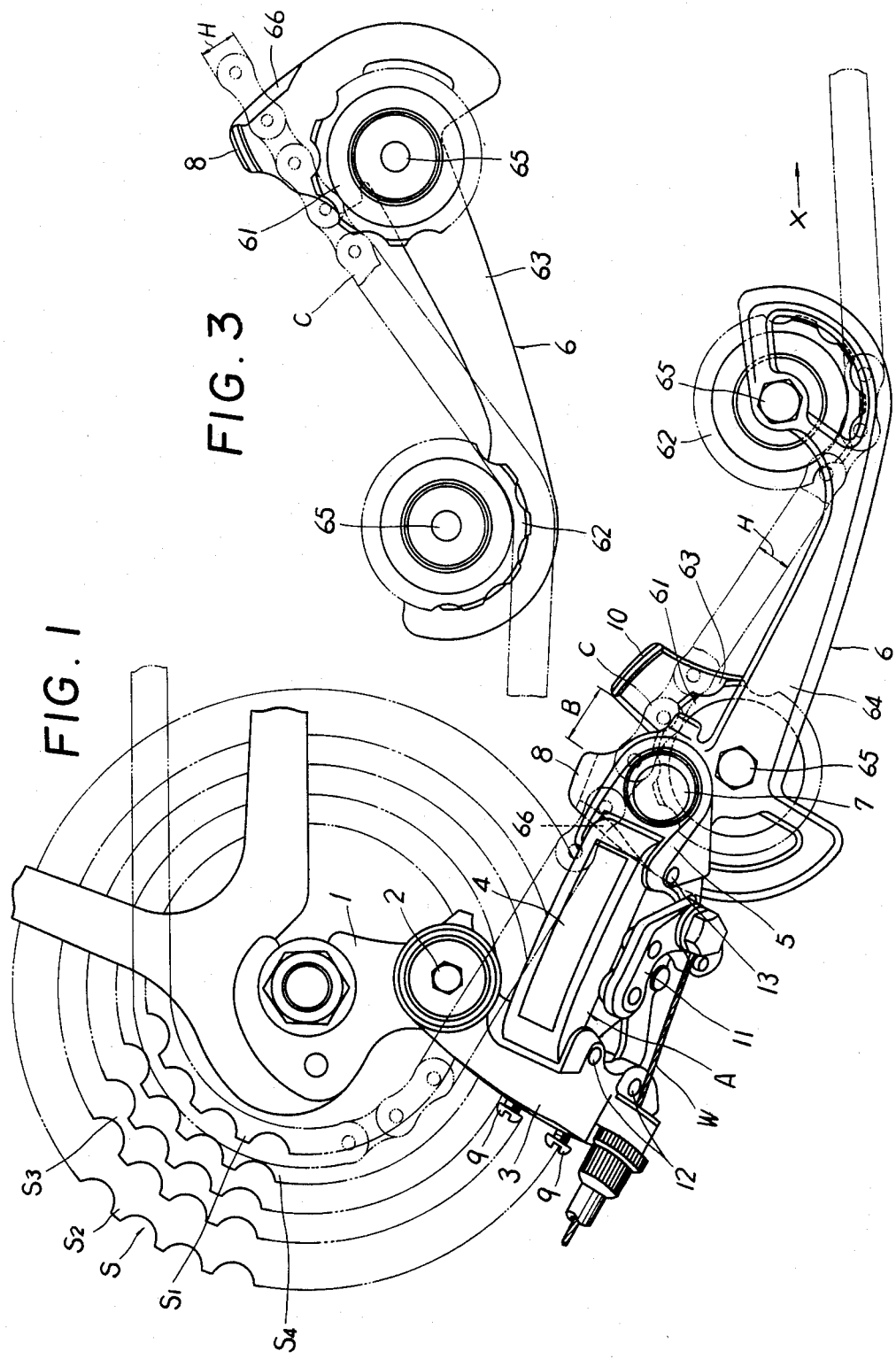
FIG. 1 is a front view of an embodiment of a rear derailleur of the invention, which is mounted together with a multistage sprocket assembly to the bicycle frame illustrating, the multi-stage sprocket assembly rotating in reverse.

The derailleur shown in the drawing includes a derailleur body A comprising a base member 3 pivoted through a horizontal shaft 2 to a mounting bracket member 1 which is mounted to the rear wheel of the bicycle, a pair of linkage members 4 supported to the base member 3, and a movable member 5 connected swingably to the base member 3 through the linkage members 4 and supporting a chain guide 6 such that it can swing to position the chain properly.

The base member 3, linkage members 4 and movable member 5 constitute a linkage mechanism. The linkage members 4 constitute a support means for supporting the chain guide 6 such that it is movable axially of the multistage sprocket assembly.

The chain guide 6 comprises a guide pulley 61, a tension pulley 62, and first and second plates 63 and 64 disposed at both sides of the pulleys 61 and 62. First plate 63 is pivoted to the movable member 5 through a pivot shaft 7, and second plate 64 is supported to the first plate 63 through a pair of pulley shafts 65. The guide pulley 61 is disposed close to the multistage sprocket assembly S and the tension pulley 62 is positioned a distance apart therefrom. The driving chain C, which is stretched across the front gear (not shown) and the multistage sprocket assembly S, engages with the pulleys 61 and 62; a control wire is pulled to move the movable member 5 toward the low speed sprocket $S_2$ which has the largest number of teeth against a return spring (not shown). The return spring restores the movable member 5 toward the high speed sprocket $S_1$, which has the smallest number of teeth thereby switching the chain C to a selected sprocket of the multistage sprocket assembly. A tension spring (not shown) is interposed between the chain guide 6 and the movable member 5 to bias the chain guide 6 clockwise in FIG. 1 to apply tension to the chain C.

When the multistage sprocket assembly S rotates in reverse as a result of reverse pedalling, the chain, which is in engagement with the pulleys 61 and 62, is forcibly pulled toward the front gear (in the direction of the arrow X in FIG. 1) against the chain tension so that the chain guide 6 largely swings toward the front gear as shown in FIG. 1. Also, the chain moving path, which extends along the multistage sprocket assembly S, guide pulley 61 and tension pulley 62, is formed in a straight line connecting one sprocket of the multistage sprocket assembly S and the tension pulley 62.

The derailleur of the invention is provided at the first plate 63 at the chain guide 6 positioned at the derailleur body side with a first restrainer 8. First restrainer 8 is disposed at the guide pulley 61 side and radially outwardly of the guide pulley 61 at a position outside the path of the movement of the chain extending along the high speed sprocket $S_1$, guide pulley 61 and tension pulley 62 when the multistage sprocket assembly S rotates in reverse. First restrainer 8 prevents the chain from or moving away from the proper chain line position when the multistage sprocket assembly S rotates in reverse.

The first restrainer 8 is preferably integral with the first plate 63. For example, a projection is provided at the end of the side of first plate 63 adjacent to guide pulley 61. This projection extends radially outwardly of the guide pulley 61 and is bent at its utmost end at a right angle toward the guide pulley 61.

Also, the first restrainer 8 is spaced from the tooth crest of guide pulley 61 at an interval which is larger than a height H of the chain C. Alternatively, the interval may be smaller than the height H. When the restrainer 8 is disposed at an interval larger than the height H, it is advantageous for the chain to be able to be carried out without hindrance by the guide pulley 61 without being cut while being moved.

Also, the first restrainer 8 is not particularly limited in its projecting length toward the guide pulley 61 with respect to the first plate 63. However, with chain C engaged with high speed sprocket $S_3$ adjacent to low speed sprocket $S_2$, if the multistage sprocket assembly S is rotated in reverse and chain guide 6 swings largely toward the front gear side, even when adjusting screws 9 have been set so that a swinging range of each linkage member 4 has been improperly adjusted, the restrainer 8 is preferably formed to have a length sufficient so that it is free from interference with the tooth crest at the low speed sprocket $S_2$. Also, the first restrainer 8 is not particularly limited in its length in the direction of the chain line L.

In addition, the derailleur according to the invention is provided with a guide face 66 at the first plate 63 and at the entrance of the chain for the guide pulley 61. Guide face 66 guides the chain when it is moving in reverse to thereby allow the chain to avoid being caught by the first plate 63 so as to make the chain easily movable in reverse. The guide face 66 is slanted at the entrance side end of first plate 63.

Figure 2:
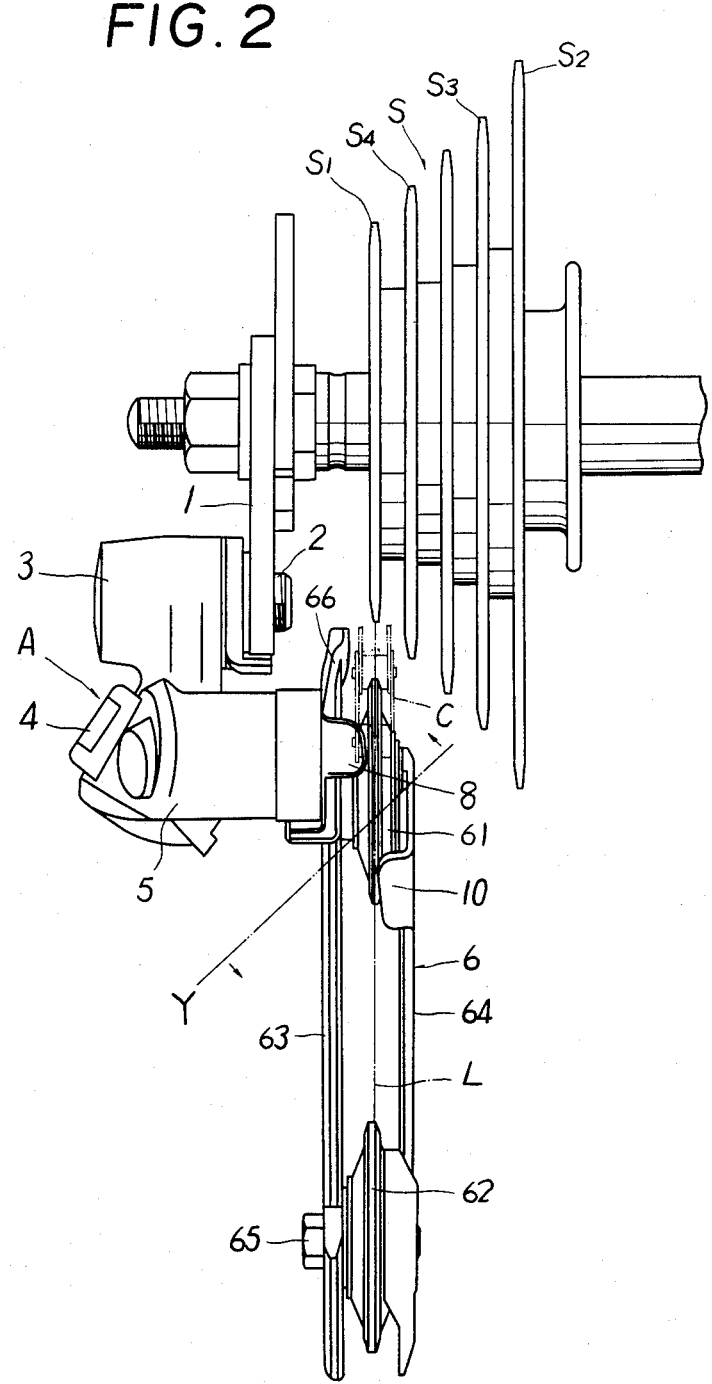
FIG. 2 is a side view of the rear derailleur of FIG. 1.

A second restrainer 10 is provided at second plate 64 and radially outwardly of the guide pulley 61 and outside the chain line extending between the low speed sprocket $S_2$ and the tension pulley 62 when the multistage sprocket assembly S rotates in reverse. Second restrainer 10 is provided for preventing the chain from escaping or moving away from the proper chain line position when the chain travels from the low speed sprocket $S_2$ to the tension pulley 62 through the guide pulley 61 as a result of the reverse rotation of the sprocket assembly S. Hence, the first restrainer 8 at the first plate 63 and the second restrainer 10 at the second plate 64 can completely prevent escape of the chain from each pulley which might otherwise result from reverse rotation of the multistage sprocket assembly S. Also, the second restrainer 10 is spaced from the first restrainer 8 at an interval B through which the chain can be passed. Hence, the chain C in engagement with the guide pulley 61 is slanted as shown by the chain line in FIG. 2 to be inserted between the first restrainer 8 and the second restrainer 10 and then the chain is turned in the direction of the arrows in FIG. 2, thereby engaging with the guide pulley 61.

In the embodiment of the invention, as shown in FIG. 1, the derailleur includes a saver arm 11 supported swingably to the linkage member 4 and fixedly supporting a control wire W. Between the saver arm 11 and the linkage member 4 is interposed a saver spring (not shown) to conserve energy. Control wire W is controllable through the saver mechanism even when a resistance against speed change caused by pulling the control wire when the chain is not being driven is larger than a usual resistance against speed change when the cabin is being driven. The saver arm 11, for normal speed change resistance, associates with the linkage member 4. When a resistance against speed change is larger than the normal one, saver arm 11 swings with respect to the linkage member 4 against the saver spring to switch the chain to a desired speed change stage. When this large resistance is eliminated, the stored energy of the saver spring actuates the linkage members 4 and allows the chain guide 6 to move to the speed change stage previously switched by the control wire W.

In addition, a pair of pins 12 are provided for connecting the linkage members 4 and base member 3 and a pair of pins 13 are provided for connecting the movable member 5 and linkage members 4. Pins 12 and 13 are slanted with respect to a plane perpendicular to the axis of multistage sprocket assembly S so that when the chain is switched, the chain guide 6 is moved in parallel to the axis of the sprocket assembly S and simultaneously in the plane perpendicular to the axis of the same and radially thereof.

If control wire W is pulled when chain guide 6 occupies a position corresponding to the high speed sprocket (i.e., the so-called the top gear), the portions of the chain which are engaged with the guide pulley 61 and tension pulley 62 move together with the chain guide 6 toward the low speed sprocket $S_2$ in a range wherein the chain is allowed to move axially of the sprocket $S_2$. On the other hand, the portion of the chain which is engaged with the high speed sprocket $S_1$ is intended to remain thereat, whereby the chain is slanted between the high speed sprocket $S_1$ and the guide pulley 61, with the slanted portion of the chain contacting the teeth of the low speed sprocket $S_4$ adjacent to the high speed sprocket $S_1$ and also contacting first plate 63. Also, at this time, when the reverse pedalling rotates the multistage sprocket assembly S in reverse, the portions of the chain which are engaged with the pulleys 61 and 62 are forcibly pulled toward the front gear so that the chain guide 6 largely swings toward the same, whereby the chain moving path between the high speed sprocket $S_1$ and the tension pulley 62 becomes linear as shown in FIG. 1 and the chain moves in reverse.

At this time, the first restrainer 8 interferes with the chain to prevent its wave-motion which would otherwise be when the connecting pin and the outer plate edge at the chain are caught by the teeth of the sprocket $S_4$ and the chain disengages from the sprocket $S_4$. As a result, the chain is prevented from falling down beyond the first plate 63 and sidewards thereof.

Also, the guide face 66 at the first plate 63 serves to guide the chain to the guide pulley 61 to reduce the amplitude of the wave-motion of the chain, thereby enabling smooth reverse movement thereof.

The first restrainer 8 also interferes with the chain swollen radially outwardly of the guide pulley 61 when the bicycle is moved backwardly in condition of slanting the chain between the high speed sprocket $S_1$ and the guide pulley 61 to result in making it difficult to move the slanted chain portion in reverse. As a result, the chain is prevented from falling down beyond the first plate 63 and sidewards thereof.

It is apparent from the foregoing that, even when the cyclist pedals in reverse or moves the bicycle backwardly in a condition where the chain engages with the high speed sprocket $S_1$ and the operating lever is operated to the low speed stage, the chain is reliably prevented from coming free of the plate. As a result, this structure solves the problem of a breakdown of the derailleur which otherwise would tend to occur.

While a preferred embodiment of the invention has been described using specific terms, such description is for illustrative purpose only, and it is to be understood that changes and variations may be made without departing from the spirit and scope of the following claims.

What is claimed is:

1. A rear bicycle derailleur for switching a driving chain to a selected sprocket of a multistage sprocket assembly of a bicycle, said derailleur comprising:
   a chain guide comprising a guide pulley, a tension pulley and first and second plates supporting said guide pulley and said tension pulley, and
   a derailleur body having a movable member supporting said chain guide and support means supporting said movable member to be movable axially of said multistage sprocket assembly.
   said first plate comprising a first restrainer at a side of said first plate adjacent said derailleur body, said first restrainer being positioned radially outwardly relative to said guide pulley at a location outside a first predetermined chain movement path along which said chain travels from a high speed sprocket of said multistage sprocket assembly to said tension pulley through said guide pulley when said multistage sprocket assembly rotates in reverse, whereby said chain is prevented from moving away from said first chain movement path when said multistage sprocket assembly rotates in reverse.

2. A rear derailleur for a bicycle according to claim 1, wherein said second plate comprises a second restrainer positioned radially outwardly relative to said guide pulley at a location outside a second predetermined chain movement path along which said chain travels from a low speed sprocket of said multistage sprocket assembly to said tension pulley through said guide pulley when said multistage sprocket assembly rotates in reverse, whereby said chain is prevented from moving away from said second chain movement path when said multistage sprocket assembly rotates in reverse.

3. A rear derailleur for a bicycle according to claim 2, wherein said first and second restrainers are disposed on said first and second plates respectively and are spaced apart a distance sufficient to allow said chain to pass therebetween to enable said chain to be mounted on or removed from said guide and tension pulleys.

* * * * *